United States Patent [19]

Solaroli

[11] Patent Number: 4,474,283

[45] Date of Patent: Oct. 2, 1984

[54] APPARATUS FOR CHECKING FEATURES OF MECHANICAL PIECES, OR OTHER OBJECTS, TRANSPORTED BY A CONVEYOR

[75] Inventor: Sergio Solaroli, Bologna, Italy

[73] Assignee: Finike Italiana Marposs S.p.A., S. Marino di Bentivoglio, Italy

[21] Appl. No.: 366,131

[22] Filed: Apr. 6, 1982

[30] Foreign Application Priority Data

Nov. 20, 1981 [IT] Italy ................................ 3577 A/81

[51] Int. Cl.$^3$ ................................ B65G 47/00

[52] U.S. Cl. ................................ 198/502; 198/346

[58] Field of Search ................................ 198/346, 341, 502; 33/147 E, 147 R, 147 N, 147 H, 143 L

[56] References Cited

U.S. PATENT DOCUMENTS 3,037,332 6/1962 Wiatt et al. ................................ 33/147 R 3,283,918 11/1966 Devol ................................ 198/341

3,974,569 8/1976 Albertazzi ................................ 33/147 E

*Primary Examiner*—Joseph E. Valenza

*Assistant Examiner*—Kyle E. Shane

*Attorney, Agent, or Firm*—Stevens, Davis, Miller & Mosher

[57] ABSTRACT

An apparatus for checking features, particularly linear dimensions, of mechanical pieces being transported by a conveyor, comprising a slide supporting a gauging device adapted to check the subsequent pieces and cam devices for actuating the slide and the gauging device. The actuating devices are coupled to the slide in such a way that the slide performs a reciprocating motion including a forward stroke, during which a piece is checked, and a return stroke for rendering possible the checking of the subsequent piece. The checking of each piece is carried out during a portion of the forward stroke of the slide, while the slide moves in synchronism with the conveyor.

14 Claims, 6 Drawing Figures

APPARATUS FOR CHECKING FEATURES OF MECHANICAL PIECES, OR OTHER OBJECTS, TRANSPORTED BY A CONVEYOR

The present invention relates to an apparatus for checking features of mechanical pieces, or other objects, being transported by a conveyor, including a base, a support being movable with respect to the base, checking means arranged on the support, and control means for controlling the support and the checking means.

As already known, normally the checking of dimensional and shape features of mechanical pieces before, during or after machining, or other operations, is accomplished by bringing the piece into cooperation with the checking means that are positioned in one or more stationary places, or measuring stations. Thus the checking operations can be of a "pre-process", "in-process" or "post-process" type.

Depending on the application, the checking operation can be performed when the piece is stationary or moving, with respect to the checking means. In this second case the piece, or the checking means, can be displaced for checking purposes (for example to enable the checking means to scan a surface of the piece) or for machining requirements, or—according to another application—the piece is checked "on the fly", i.e. while it is conveyed from a machining station to another, or directed towards a suitable receptacle.

A typical example of the checking of moving pieces is that of the diameters of pieces coming out of a centerless grinding machine, such checking being carried out on the fly, i.e. while the pieces pass in front of one or more gauging heads positioned downstream of the grinding machine.

It is also known that in the plants for the production and machining of mechanical workpieces there are used conveying and transporting devices of various types that direct the workpieces from one machining station to another.

During the actual machining phase and depending on the type of machining operation, the workpiece can be supported by the conveyor or, after having been unloaded from it, can be suitably positioned on the machining station.

Up to now, the checking and measurement of pieces being transported by conveyors has been limited to on the fly checks. This type of check presents however some drawbacks, like the limited time available for the checking, because the piece is moving more or less rapidly in front of the checking means, the difficulty or impossibility to scan or approach different areas or surfaces of the piece, and poor measurement accuracy and repeatability.

An object of the present invention is to provide an apparatus capable of checking features of pieces while the latter are being transported by a conveyor, that enables performing considerably long and/or complicated checks without there being any problems for the checking means reaching the piece surfaces.

This and other objects are attained through an apparatus of the type outlined at the beginning of the present description wherein, according to the invention, the control means are adapted to move—for a prefixed distance—the support substantially in synchronism with the conveyor and with a prefixed phase with respect to the piece to be checked, and to control the checking means, in order to accomplish the check while the support moves along the prefixed distance.

The invention is described in detail with reference to the accompanying drawings, given by way of non-limiting example, in which.

Figure 6:
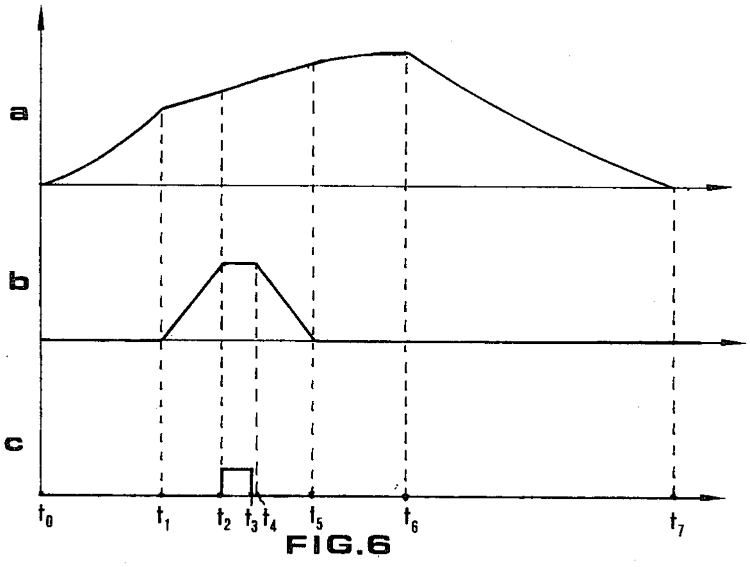

FIG. 6 includes three illustrative diagrams of the operating cycle of the apparatus shown in the previous figures.

Figure 1:
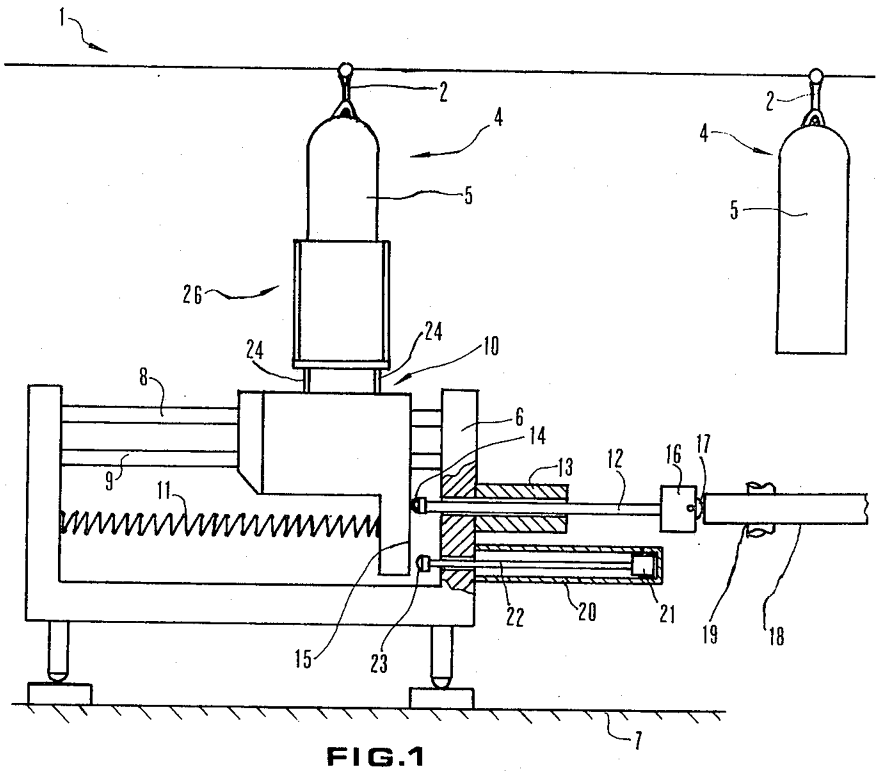
FIG. 1 is a lateral, schematic, partial cross-sectional view showing the main elements of an apparatus according to a preferred embodiment of the invention.

With reference to FIG. 1, a chain conveyor 1—schematically shown and, however, per se known—supports at constant intervals hooks 2 that hang pieces 4, having a cylindrical surface 5, the diameters of which must be checked while the pieces 4 are being transported by conveyor 1. The speed of conveyor 1 can be constant or variable.

A support frame 6, fixed with respect to a bed or base 7, supports horizontal guide rods 8 and 9 along which a support or slide 10, which includes bushings—not shown—that cooperate with rods 8 and 9, can move.

A compression spring 11, having its ends coupled to frame 6 and slide 10, tends to move slide 10 forwards, i.e. with reference to FIG. 1, from left to right.

A control rod 12, horizontally guided by a bushings 13, fixed to frame 6, bears at one end a limit-stop element 14 that can contact a vertical wall 15 of slide 10 and at the opposite end a member 16 that carries a roller 17 rotatable about an axis that is perpendicular to the axis of rod 12. Roller 17 contacts the surface of a cam 18 keyed to a shaft 19.

A pneumatic horizontal cylinder 20, also fixed to frame 6, has inside a movable piston 21 connected with a rod 22 passing through a wall of frame 6 and ending, at the opposite end to that connected with piston 21, with a limit-stop 23 that, as a consequence of the actuation of cylinder 2, can contact wall 15 in order to move slide 10 from right to left-by overcoming the thrust applied by spring 11, to a rest position.

Slide 10 supports—by means of two pairs of levers 24 and 25 (FIG. 4) a gauging device 26, that will be described more specifically with reference to FIG. 4.

Figure 2:
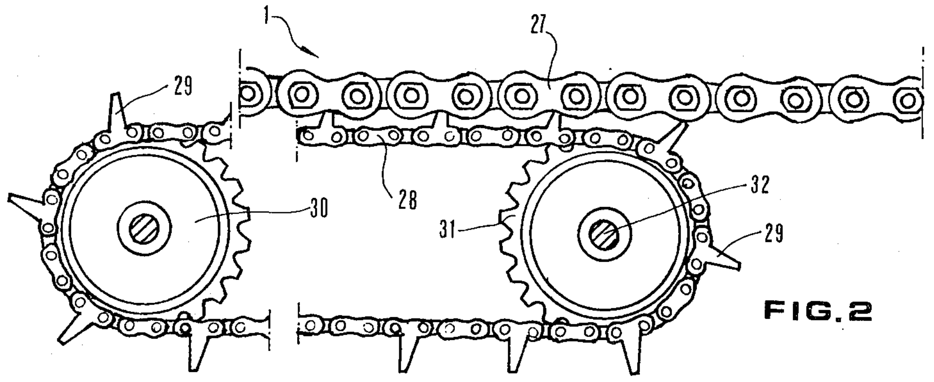
FIG. 2 shows the mechanical connection between the conveyor, that transports the pieces to be checked, and a control shaft of the apparatus shown in FIG. 1.

As shown in FIG. 2, conveyor 1 includes a chain 27 actuated by a sprocket wheel—not shown—that cooperates with another sprocket wheel—also not shown. As already mentioned, hooks 2 hang, at regularly spaced intervals, from chain 27, which can be considerably long and which can move at a constant or—within certain limits—variable speed.

The section of chain 27 shown in FIG. 2 moves along in the opposite direction to that schematically shown in FIG. 1, i.e. from right to left, as the section of chain shown in FIG. 1 is located at one side and that of FIG.

2 at the opposite side with respect to the sprocket wheels of conveyor 1.

Obviously hooks 2 are made in such a way as to avoid interfering with the sprocket wheels of conveyor 1, or (as it is assumed with reference to FIG. 2) are initially coupled to chain 27 and then uncoupled from it in correspondence with the stroke shown in FIG. 1.

The apparatus shown in FIG. 1 foresees a control device of shaft 19 including a second chain 28, partially shown in FIG. 2, with teeth 29 that engage with the rollers of chain 27, in such a way that chain 28 has instant by instant a linear movement speed identical to that of chain 27.

Chain 28 is coupled with two sprocket wheels 30 and 31, the first of which, 30, is supported by a chain stretcher transmission—not shown—while the second one, 31, is keyed to a shaft 32.

The diameter of sprocket wheel 31 is such that a displacement of chain 27, equal to the interval of space separating one hook 2 from another, is equivalent to a rotation of 360° of shaft 32.

Figure 3:
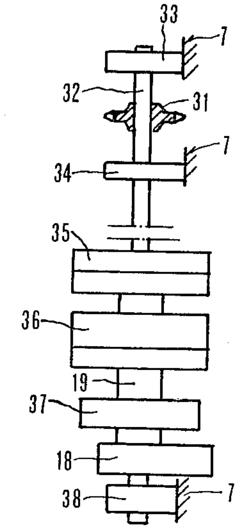
FIG. 3 is a kinematic diagram further showing the mechanical connection existing between the conveyor and the apparatus shown in FIG. 1.

With reference to FIG. 3, shaft 32 is supported by supports 33 and 34 fixed to bed 7 and it is coupled, by means of an adjustable joint 35 and a disengagement joint 36, with shaft 19 whereupon there are keyed cam 18 and a second cam 37 that serves to actuate gauging device 26.

Shaft 19 is supported by supports fixed to bed 7, one of which 38 is shown in FIG. 3.

Figure 4:
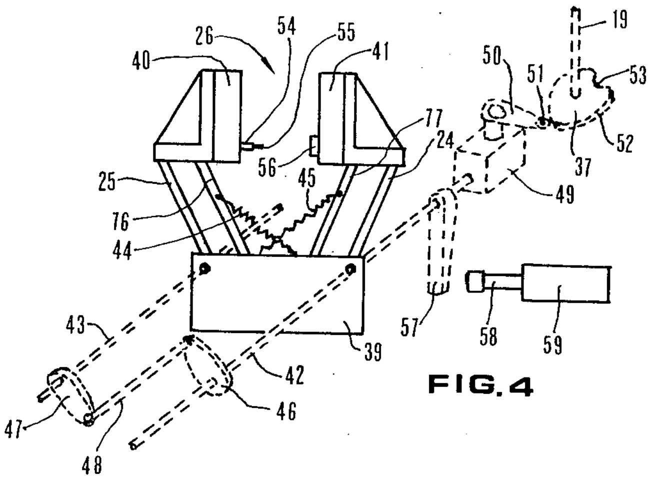
FIG. 4 is a sketch schematically showing a gauging device mounted on a slide of the apparatus shown in the previous figures and control elements of the gauging device.

With reference to the particularly schematic sketch shown in FIG. 4, a plate 39 fixed to slide 10 carries, by means of two pairs of levers 24 and 25 and two other pairs of levers 76 and 77, two jaws 40 and 41. For simplicity's sake, plate 39 and jaws 40 and 41 are shown in a front view and consequently just one lever of each pair is shown.

Levers 76 and 77 are hinged to plate 39 and to a base of jaws 40 and 41. Also levers 24 and 25 are hinged to the base of jaws 40 and 41.

Plate 39 has two through holes that are parallel to rods 8 and 9 for the passage of two shafts 42 and 43, also parallel to rods 8 and 9. Shafts 42 and 43 are fixed to bed 7, in a way that has not been shown, so that they are axially stationary and can rotate about their geometrical axes. Shafts 42 and 43 are provided with longitudinal grooves, or slots for keys.

The lower ends—not shown—of levers 24 and 25 have holes for the passage of shafts 42 and 43 and keys that engage in the slots of shafts 42 and 43. Consequently slide 10 can slide along shafts 42 and 43 and rotational displacements of shafts 42 and 43 cause corresponding rotational displacements of levers 24 and 25.

Springs 44 and 45, connected between the two pairs of levers 76 and 77, tend to cause jaws 40 and 41 to move towards one another. The jaws 40 and 41 have facing surfaces adapted to clamp cylindrical surface 5.

Shafts 42 and 43 are connected by means of two handwheels 46 and 47 and a rod 48, so that a rotatory displacement, in a clockwise direction, of shaft 42 causes a rotatory displacement of shaft 43, in a counterclockwise direction. These displacements cause jaws 40 and 41 to move apart.

Shaft 42 is connected, by means of a transmission device including an angular transmission, schematically represented by a box 49, to a mechanism including a lever 50 and a roller 51.

The action of springs 44 and 45, that urges jaws 40 and 41 to move towards each other causes, through the formerly described transmission elements, an action that tends to push roller 51 against the contour of cam 37. The contour has a section 52 with a constant radius and a section 53 with a radius at first decreasing, then constant and finally increasing.

When roller 51 contacts section 52, jaws 40 and 41 are set apart. When the roller contacts the part of section 53 with a decreasing radius, jaws 40 and 41 clamp surface 5 and remain in this position until, by continuing the rotation of shaft 19, roller 51 contacts the part of section 53 with an increasing radius. Cam 37 then causes the clockwise rotation of shaft 42 and consequently makes jaws 40 and 41 move apart.

To jaw 40 there is fixed a gauging head 54 including a movable feeler 55 that contacts a limit stop surface 56 of jaw 41 whenever jaws 40 and 41 move towards each other.

The "closure" position of jaws 40 and 41 depends (as the constant radius portion of section 53 of cam 37 has a sufficiently small radius) on the diameter of the cylindrical surface 5 clamped by the jaw. The value of the diameter is detected depending on the corresponding signal of gauging head 54.

On shaft 42 there is keyed a lever 57 that rod 58 of a pneumatic cylinder 50 can actuate, so as to make shaft 42 rotate in clockwise direction for a prefixed amount of space and so maintain jaws 40 and 41 set apart, regardless of the position of cam 37.

Figure 5:
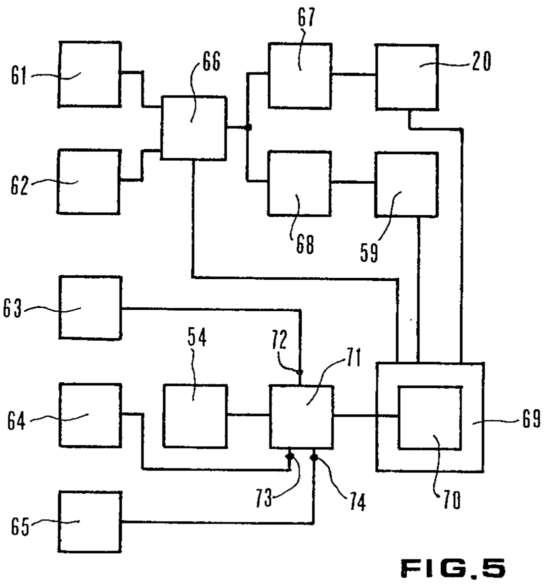
FIG. 5 is a block diagram showing the functional connections existing between some logic control and display elements of the apparatus.

In the block diagram shown in FIG. 5, reference 61 indicates a proximity switch, or an equivalent device, fixed to the support frame 6, that detects the arrival of the subsequent pieces 4 in correspondence to frame 6.

Another proximity switch 6, fixed to frame 6, switches when slide 10 reaches the end of the return stroke.

In the gauging device 26 there are mounted a third proximity switch 63 adapted to detect the presence or absence of a piece 4 between jaws 40 and 41 and a fourth proximity switch 64 adapted to detect "opening" or "closure" positions of jaws 40 and 41.

A fifth proximity switch 65 is fixed to frame 6 to detect the passage of slide 10, in the course of its forward stroke, in correspondence to a prefixed position with respect to rods 8 and 9. Switches 61–65 have not been shown in FIGS. 1 and 4 for simplicity's sake.

Switches 61 and 62 are connected to a logic circuit 66, the functioning principle of which will be described hereinafter. Logic circuit 66 has an output connected to two control circuits 67 and 68 that command pneumatic cylinders 20 and 59 respectively. Logic circuit 66 has a third output connected to a unit 69 including display, control and alarm devices—not shown—as well as a unit 70 for the display of the measurements detected on pieces 4 and their printing. Pieces 4 that are conveyed by conveyor 1 can be marked with a progressive number and it is possible to obtain, for example by means of a counter, arranged in unit 70 and controlled by switch 61, a listing of the measurements including the numbers that identify pieces 4.

Naturally different constructional features can be used for associating to every piece 4 unloaded by conveyor 1 its associated measurement—detected by the gauging device 26.

The output of the gauging head 54 is connected to the input of a circuit 71, for enabling the measurement detection, that in turn has an output connected to unit 70 and three enabling terminals 72, 73 and 74 connected to proximity switches 63, 64 and 65 respectively.

The working cycle of the apparatus is now described with reference to diagrams (a), (b) and (c) shown in FIG. 6. With relation to time—marked on the abscissa line—the diagrams show the position of slide 10, the position of jaws 40 and 41 and the condition of the enabling circuit 71, respectively.

At instant $t_0$ roller 17 contacts the point of cam 18 corresponding to the condition of maximum distance of roller 17 from the axis of rotation of cam 18 while slide 10 is in turn at the end of its return stroke. Due to the rotation of shaft 19, assumed to occur at a substantially constant angular speed for all the cycle, in front of roller 17 there runs at first a section of cam 18 shaped in such a way that rod 12, pushed by slide 10 that is in turn urged by spring 11, moves in the time interval between $t_0$ and $t_1$ from left to right in FIG. 1, at a constant acceleration. At instant $t_1$ roller 17 enters into contact with a second section of cam 18 that enables, for the time lapsing between $t_1$ and $t_5$, a displacement of rod 12 and of slide 10, again from left to right, at a constant speed.

At instant $t_5$ roller 17 enters into contact with a third section of cam 18 whose contour determines a constant deceleration of the displacement from left to right of roller 17 and of slide 10 until, at instant $t_6$, roller 17 contacts a point of cam 18 contour corresponding to the minimum distance of roller 17 from the rotational axis of the cam 18. Thus at instant $t_6$, slide 10 is at the end of its forward stroke. In the lapse of time between $t_6$ and $t_7$, roller 17 contacts a section of cam 18 that determines a displacement of roller 17, from right to left, that ends when the roller reaches the same position it assumes at instant $t_0$. Consequently, at instant $t_7$ slide 10 too is again at the end of the return stroke.

As far as jaws 40 and 41 are concerned, cam 37 has a shape causing them to stay in an open position in the time intervals between $t_0$ and $t_1$ and between $t_5$ and $t_7$. During the time interval between $t_1$ and $t_2$, cam 37 cooperates with roller 51 so as to enable the closure of jaws 40 and 41, as a consequence of the action of springs 44 and 45, so that jaws 40 and 41 clamp piece 4 arranged between them. Naturally, as already mentioned, the closure position of jaws 40 and 41 depends on the diameter of the envelope cylinder of surface 5.

In the time lapsing between $t_2$ and $t_4$, jaws 40 and 41 stay closed and move apart again in the time lapse between $t_4$ and $t_5$ due to the action of cam 37.

Measurement taking occurs in the time lapse between $t_2$ and $t_3$ as the enabling circuit 71 provides an enabling signal whenever switches 63, 64 and 65 detect that a piece 4 is located between jaws 40 and 41, that jaws 40 and 41 are closed and that slide 10, at instant $t_2$ is in the position corresponding to the position shown in FIG. 6_a_ respectively.

Logic circuit 66 shown in FIG. 5 has the following functions.

If, at a certain point, the output signals of switches 61 and 62 indicate that a piece 4 is arriving and that slide 10 is exactly at the end of its return stroke respectively, the output of circuit 66 actuates control circuits 67 and 68 so that they cause rods 22 and 58 to stay in—or return to—the end position of the stroke from left to right, so enabling the control of slide 10 and jaws 40 and 41 by means of spring 11, 44 and 45 and cams 18 and 37.

If, on the contrary, switch 61 indicates that a piece 4 is arriving, but switch 62 indicates that slide 10 is not at the end of its return stroke, circuit 66 provides an alarm signal to unit 69.

Should switch 62 detect that slide 10 is at the end of its return stroke and switch 61 does not detect the arrival of a piece 4, circuit 66 acts on the control circuits 67 and 68 so that they cause the displacement of rods 22 and 58 to the left, in order to avoid unnecessary actuations of slide 10 and of jaws 40 and 41 by springs 11, 44 and 45 and cams 18 and 37.

Lastly, if the arrival of a piece 4 is not detected and slide 10 is not at the end of its return stroke, the outputs of circuit 66 do not cause any actuation.

Should conveyor 1 always be actuated at a strictly constant speed, it would be possible to modify the previously described apparatus by eliminating the mechanism including cams 18 and 37 and employing a release device of slide 10 that, upon the arrival of any piece 4, moves slide 10 forwards until the gauging device 26 reaches piece 4. Jaws 40 and 41 are then actuated, for example by means of a delay circuit, so as to clamp surface 5 of piece 4. The following forward displacement of slide 10 occurs because slide 10 is dragged, through jaws 40 and 41, by piece 4, that is in turn dragged by conveyor 1. Consequently, once a measurement has been taken, jaws 40 and 41 are unlocked and the retraction of slide 10 is controlled by a pneumatic recoil cylinder.

It is obvious that the apparatus according to this invention can foresee a plurality of gauging heads to check, for example, a plurality of diameters or other dimensions, shape errors, etc.—and/or nondimensional nor geometrical features—of mechanical pieces or objects of another type.

It will of course also be realized that the apparatus can undergo further modifications and variants equivalent from a functional and structural point of view without departing from the scope and ambit of the invention.

What is claimed is:

1. An apparatus for performing determined operations on mechanical pieces, or other objects being transported by a conveyor along a determined path, comprising:

a first support;

a second support coupled to the first support for reciprocating motion therealong;

first control means including: resilient means adapted to apply a resilient thrust to the second support for displacing it along a forward stroke with respect to the first support; transmission means coupled to and receiving operating power from the conveyor; and movable stop means coupled to the transmission means for receiving motion therefrom, the stop means being adapted to cooperate with the second support for contrasting said resilient thrust and determining the speed of the second support during said forward stroke, whereby the second support displaces in synchronism with the conveyor during at least a portion of the forward stroke and the stop means control the return stroke of the second support;

operation performing means arranged on the second support for performing said operations; and second control means coupled to the operation performing means for actuating the operation performing means during the forward stroke of the second support.

2. The apparatus as claimed in claim 1, further comprising a control device adapted to cooperate with the second support for maintaining it at the end of the return stroke independently from the operation of the transmission means and stop means.

3. The apparatus according to claim 1, wherein said transmission means include a shaft, first transmission elements connectable to the conveyor in order to make the shaft rotate, a first cam coupled to the shaft and second transmission elements actuated by the cam, said stop means being coupled to the second transmission elements.

4. The apparatus according to claim 3, wherein said operation performing means include clamping jaws adapted to clamp each piece and at least a gauging head for checking linear dimensions of the pieces and the second control means include resilient means adapted to make the jaws clamp the piece.

5. The apparatus according to claim 4, wherein said second control means include a second cam fixed to said shaft and third transmission elements adapted to cooperate with the second cam in order to move said jaws apart.

6. The apparatus according to claim 5, wherein said first control means include a first actuator adapted to keep the second support in a rest position, uncoupling the second support from the second transmission elements, and a second actuator adapted to uncouple the jaws from the second cam.

7. The apparatus according to claim 6, wherein said first and second control means include a first logic element adapted to detect the arrival of pieces near said rest position of the second support, a second logic element adapted to detect the presence of the second support in said rest position, and a logic circuit connected to the two logic elements for providing control signals for said actuators.

8. The apparatus according to claim 7, wherein said first and second control means include a third logic element adapted to detect the presence of a piece between the jaws, a fourth logic element adapted to detect the closure condition of the jaws on a piece, a fifth logic element adapted to detect a prefixed position of the second support and an enabling circuit controlled by the third, fourth and fifth logic elements to enable the detection of the measurement provided by the gauging head.

9. The apparatus according to claim 4, for checking pieces transported by a chain conveyor, wherein said first transmission elements include a second chain with teeth adapted to engage the conveyor chain.

10. An apparatus for checking features of mechanical pieces, or other objects transported by a conveyor along a determined path, comprising:

a support;

a slide coupled to the support for alternatively performing a forward stroke and a return stroke with respect to the support;

first control means acting on the slide for controlling said strokes, the first control means being coupled to the conveyor for rendering at least a portion of the forward stroke synchronous with the conveyor;

checking means arranged on the slide and including clamping means adapted to clamp the pieces to be checked and checking devices for checking said features; and second control means coupled to the clamping means and the conveyor, the second control means including resilient means adapted to actuate the clamping means for clamping the piece and transmission means coupled to and receiving operating power from the conveyor, the transmission means being adapted to permit actuation of the clamping means, under the action of the resilient means, during a determined first portion of said forward stroke and being adapted to disengage the clamping means from the piece, overcoming the action of the resilient means, during a determined second portion of the forward stroke.

11. The apparatus according to claim 10, wherein said first control means include resilient means adapted to push the slide for making the slide perform its forward stroke.

12. The apparatus as claimed in claim 10, further comprising a control device adapted to cooperate with the transmission means for preventing transmission of operating power from the conveyor to the clamping means.

13. An apparatus for checking features of mechanical pieces or other objects being supported by a conveyor at a constant distance from each other and being subsequently transported by the conveyor along a determined path, comprising:

a support;

a slide movably coupled to the support, the slide being adapted to perform alternatively a forward stroke and a return stroke with respect to the support;

checking means supported by the slide and including jaws adapted to clamp the piece to be checked and checking devices for checking said features;

first control means including: first spring means cooperating with the support and the slide for urging the slide to perform said forward stroke; and first transmission means coupled to and receiving operating power from the conveyor, the first transmission means including a rotatable shaft, a first cam rotatable with the shaft as a consequence of the conveyor displacement, a rod cooperating with the first cam and slidably coupled to the support and a stop element fixed to the rod and arranged at a side of the slide, the stop element being adapted to contact the slide for contrasting the action of the first spring means and determining the speed of the slide during at least one portion of the forward stroke, whereby the slide displaces in synchronism with the conveyor during said at least one portion of the forward stroke and the stop element controls the return stroke of the slide overcoming the action of the first spring means;

second control means coupled to the jaws and the conveyor, the second control means including: second spring means coupled to the jaws and applying to the jaws a resilient action for closing the jaws against the piece to be checked; and second transmission means coupled to and receiving operating power from the first transmission means, the second transmission means including a second cam fixed to said shaft, lever means cooperating with the second cam, and at least one rotatable shaft actuated by the lever means and slidably coupled to the slide, whereby the second transmission means are adapted to permit closure of the jaws, under the action of the second spring means, during said at least one portion of the forward stroke, and to open the jaws, overcoming the action of the second spring means, during a determined second portion of the forward stroke.

14. The apparatus as claimed in claim 13, further comprising a first control device having a movable stop member adapted to cooperate with the slide for maintaining it at the end of the return stroke, overcoming the action of the first spring means, and a second control device adapted to cooperate with said lever means for preventing opening of the jaws.

* * * * *